United States Patent
Said (10) Patent No.: US 8,928,179 B2
(45) Date of Patent: Jan. 6, 2015

(54) NO BREAK POWER TRANSFER FOR POWER GENERATING SYSTEM

(75) Inventor: Waleed M. Said, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 1066 days.

(21) Appl. No.: 12/961,048

(22) Filed: Dec. 6, 2010

(65) Prior Publication Data

US 2012/0139354 A1    Jun. 7, 2012

(51) Int. Cl.
*H02J 3/00* (2006.01)
*H02J 3/34* (2006.01)
*H02J 3/08* (2006.01)

(52) U.S. Cl.
CPC .... *H02J 3/34* (2013.01); *H02J 3/08* (2013.01)
USPC .............................................. 307/87; 307/45

(58) Field of Classification Search
USPC ...................................... 307/87, 45
See application file for complete search history.

(56) References Cited

U.S. PATENT DOCUMENTS

| | | | |
|---|---|---|---|
| 5,317,500 A | 5/1994 | Iden et al. | |
| 5,555,151 A | 9/1996 | Baker et al. | |
| 5,729,059 A | 3/1998 | Kilroy et al. | |
| 6,700,222 B2 * | 3/2004 | Turvey | 307/87 |
| 6,806,589 B1 | 10/2004 | Suttie | |
| 2005/0273206 A1 | 12/2005 | McGinley | |
| 2006/0214428 A1 * | 9/2006 | Altemark et al. | 290/44 |
| 2010/0276996 A1 | 11/2010 | Karipides | |

* cited by examiner

*Primary Examiner* — Rexford Barnie
*Assistant Examiner* — Dru Parries
(74) *Attorney, Agent, or Firm* — Cantor Colburn LLP (57) ABSTRACT

A method for no break power transfer in a variable frequency power generating system, the power generating system comprising a first bus connected to a first generator and a second bus connected to a second generator includes configuring a power transfer device to output power that is synchronized to match a voltage and a frequency of the second bus to the second bus; reconfiguring the power transfer device to output power that is synchronized to match a voltage and a frequency of the first bus to the second bus; and closing a tie switch located between the first bus and the second bus.

16 Claims, 5 Drawing Sheets

FIG. 5

NO BREAK POWER TRANSFER FOR POWER GENERATING SYSTEM

FIELD OF INVENTION

The subject matter disclosed herein relates generally to the field of power generating systems, and more specifically to power transfer between generators in a variable frequency power generating system.

DESCRIPTION OF RELATED ART

A variable frequency power generating system includes multiple generators that may operate at different frequencies. In a variable frequency power generating system, transferring a power bus from one generator operating at a certain frequency to another generator operating at a different frequency may require de-energizing the power bus from the first generator, and then energizing it from the second generator. A momentary interruption of power on the bus occurs between the de-energizing and the re-energizing of the bus. A power transfer with a momentary interruption of power on the bus is referred to as a break power transfer. The break is necessary because an arbitrary transfer between generators running at different frequencies may damage one or both generators. The duration of the break may be determined by a time constant of the generator line contactors that are performing the transfer, and may be 100 milliseconds or more. After being de-energized, some loads connected to the bus that have inductive or capacitive front ends may draw high inrush currents when the loads are energized again after the break and transfer. When many loads are energized at the same time, larger generators, contactors and circuit breakers may be needed in the power generating system to satisfy the demand for inrush current from the various loads.

BRIEF SUMMARY

According to one aspect of the invention, a method for no break power transfer in a variable frequency power generating system, the power generating system comprising a first bus connected to a first generator and a second bus connected to a second generator includes configuring a power transfer device to output power that is synchronized to match a voltage and a frequency of the second bus to the second bus; reconfiguring the power transfer device to output power that is synchronized to match a voltage and a frequency of the first bus to the second bus; and closing a tie switch located between the first bus and the second bus.

According to another aspect of the invention, a power transfer device for no break power transfer in a variable frequency generating system includes a voltage matching/synchronization control module, the voltage matching/synchronization control module configured to received input from a first bus and a second bus of the variable frequency power generating system; an input switch, the input switch being controlled by the voltage matching/synchronization control module; a rectifier/filter module connected to the input switch; an inverter connected to the rectifier/filter module, the inverter being controlled by the voltage matching/synchronization control module; an output filter connected to the inverter; and an output switch, the output switch being controlled by the voltage matching/synchronization control module.

According to another aspect of the invention, a variable frequency power generating system includes a first generator; a first generator line contactor controlled by a first generator control unit; a first bus powered by the first generator via the first generator line contactor; a second generator; a second generator line contactor controlled by a second generator control unit; a second bus powered by the second generator via the second generator line contactor; a tie switch located between the first bus and the second bus; and a power transfer device, the power transfer device connected between the first bus and the second bus, wherein the power transfer device is configured to output power that matches a voltage and a frequency of either of the first bus or the second bus.

Other aspects, features, and techniques of the invention will become more apparent from the following description taken in conjunction with the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Embodiments of a method for no break power transfer for a power generating system, and a power transfer device for no break power transfer for a power generating system, are provided, with exemplary embodiments being discussed below in detail. A controlled no break power transfer in a variable frequency power generating system may be achieved with the aid of power transfer device (PTD) that maintains power on the bus while the transfer from the first generator to the second generator is taking place. While an arbitrary no break power transfer between generators running at different frequencies may cause large, and sometimes damaging, power surges to circulate between the two generators, a controlled no break power transfer may reduce or eliminate the inrush current after the power transfer.

Figure 1:
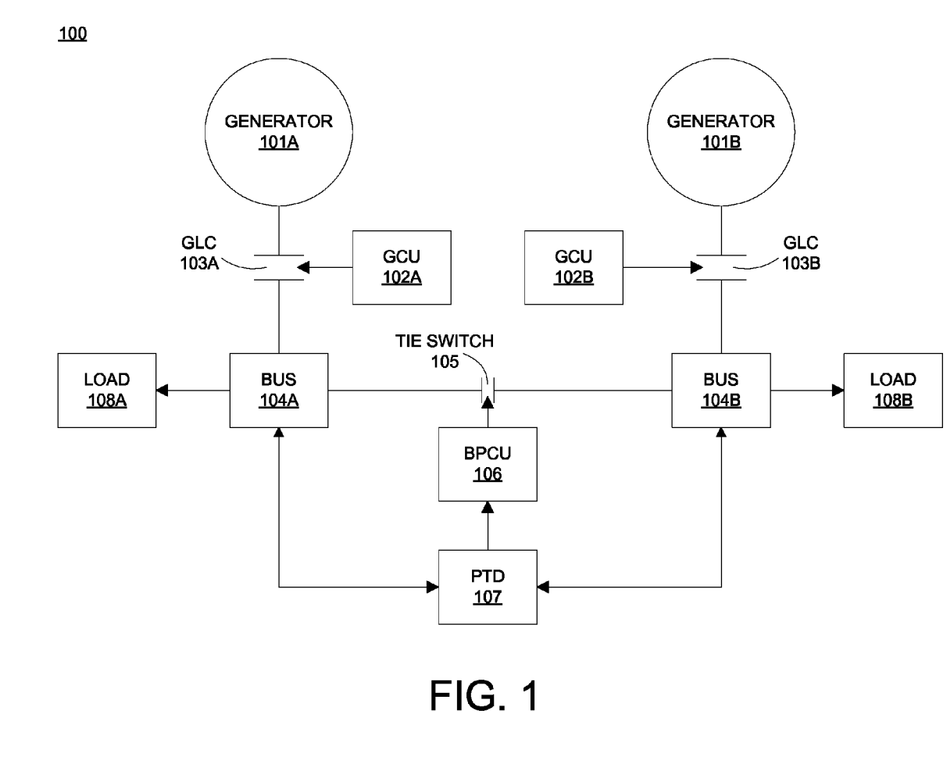
FIG. 1 illustrates an embodiment of a power generating system including a power transfer device for no break power transfer.

FIG. 1 illustrates an embodiment of a power generating system 100 including a PTD 107 for no break power transfer. Power generating system 100 is a variable frequency power generating system including two generators 101A-B that are operating at different frequencies. Generator 101A powers bus 104A via generator line contactor (GLC) 103A, which may be opened and closed by generator control unit (GCU) 102A. Bus 104A powers electrical load 108A. Generator 101B powers bus 104B via GLC 103B, which may be opened and closed by GCU 102B. Bus 104B powers electrical load 108B. Bus power control unit (BPCU) 106 opens and closes tie switch 105, and is controlled by PTD 107. PTD 107 is also connected to buses 104A-B. During normal operation, GLCs 103A-B are closed, such that bus 104A is powered by generator 101A and bus 104B is powered by generator 101B, and tie switch 105 is open. In situations in which one of the buses 104A or 104B requires power from the other bus' respective generator, due to, for example, a generator fault, power transfer may be achieved from one bus to the other using PTD 107.

Figure 2:
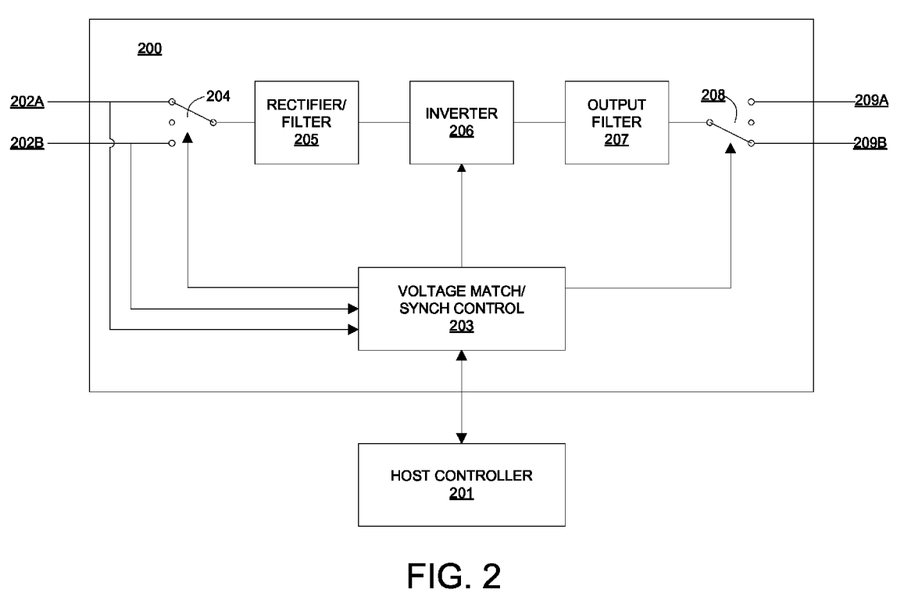
FIG. 2 illustrates an embodiment of a power transfer device for no break power transfer.

FIG. 2 illustrates an embodiment of a PTD 200 for no break power transfer. PTD 200 may comprise PTD 107 of FIG. 1, and is discussed with respect to FIG. 1. Host controller 201 activates PTD 200 in the event power transfer between buses 104A and 104B is required. Host controller 201 also communicates with GCUs 102A-B and BPCU 106. The functions of host controller 201, GCUs 102A-B, and BPCU 106 may be embodied in a single physical module in some embodiments, or in any appropriate configuration of distinct physical modules in other embodiments. PTD 200 may receive input at an input switch 204 from input 202A, which is connected to bus 104A, and from input 202B, which is connected to bus 104B. Input switch 204 may be open (i.e., not connected to either bus), or may be contacted to one of inputs 202A-B. Voltage matching/synchronization control module 203 controls input switch 204, and also determines voltage and frequency data from inputs 202A-B. When input switch 204 is contacted to an input 202A or 202B, alternating current (AC) power flows from input switch 204 to input rectifier/filter 205, where it is converted to direct current (DC) power. The DC output of input rectifier/filter 205 is sent to inverter 206. Inverter 206 is controlled by voltage matching/synchronization control module 203 to output power that matches a desired voltage and frequency. The desired voltage and frequency of the power output by inverter 206 may be determined based on either one of inputs 202A and 202B by voltage matching/synchronization control module 203. Inverter 206 outputs 3-phase alternating current (AC) power. The AC output of inverter 206 is then filtered by output filter 207. The filtered AC power from output filter 207 is then sent to output switch 208. Output switch 208 may be open (i.e. not connected to either bus), or may be contacted to one of outputs 209A-B, which are each connected to a respective one of buses 104A-B. Output switch 208 is also controlled by voltage matching and synchronization controller 203.

Figure 3:
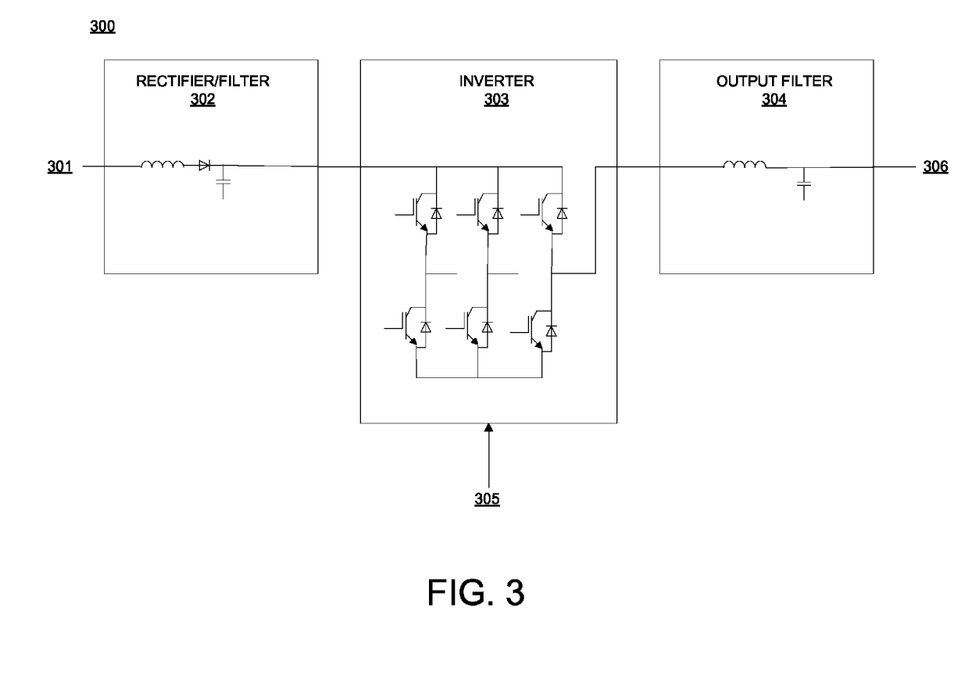
FIG. 3 illustrates a detailed view of embodiments of a rectifier/filter, inverter, and output filter for a power transfer device for no break power transfer.

FIG. 3 illustrates a detailed view 300 of embodiments of an input rectifier/filter 302, inverter 303, and output filter 304 for a power transfer device for no break power transfer. FIG. 3 is discussed with reference to FIG. 2, and input rectifier/filter 302, inverter 303, and output filter 304 may comprise input rectifier/filter 205, inverter 206, and output filter 207 of FIG. 2. Input rectifier/filter 302 receives AC power from a PTD input switch such as PTD input switch 204 of FIG. 2 at input 301. Input rectifier/filter 302 includes an inductor in series with a diode, and a capacitor connected at the diode output. Input rectifier/filter 302 converts the AC power from input 301 to DC power, which is then converted to 3-phase AC power by inverter 303. Inverter 303 converts its DC input to AC output via a set of diodes and transistors located in inverter 303. The voltage matching/synchronization control module 203 of FIG. 2 controls the diodes and switches of inverter 303 via input 305, such that the 3-phase AC power output by inverter 303 has a desired voltage and frequency. The 3-phase AC power output by inverter 303 is then filtered by output filter 304, which includes an inductor and a capacitor connected at the output of the inductor. Output filter 304 outputs the filtered 3-phase AC power to at output 306, which is connected to a PTF output switch such as PTD output switch 208 of FIG. 2. Rectifier/filter 302, inverter 303, and output filter 304 are shown for illustrative purposes only; any appropriate configuration of circuit elements may be used to convert the PTD input power to filtered 3-phase AC output power having the desired voltage and frequency.

Figure 4:
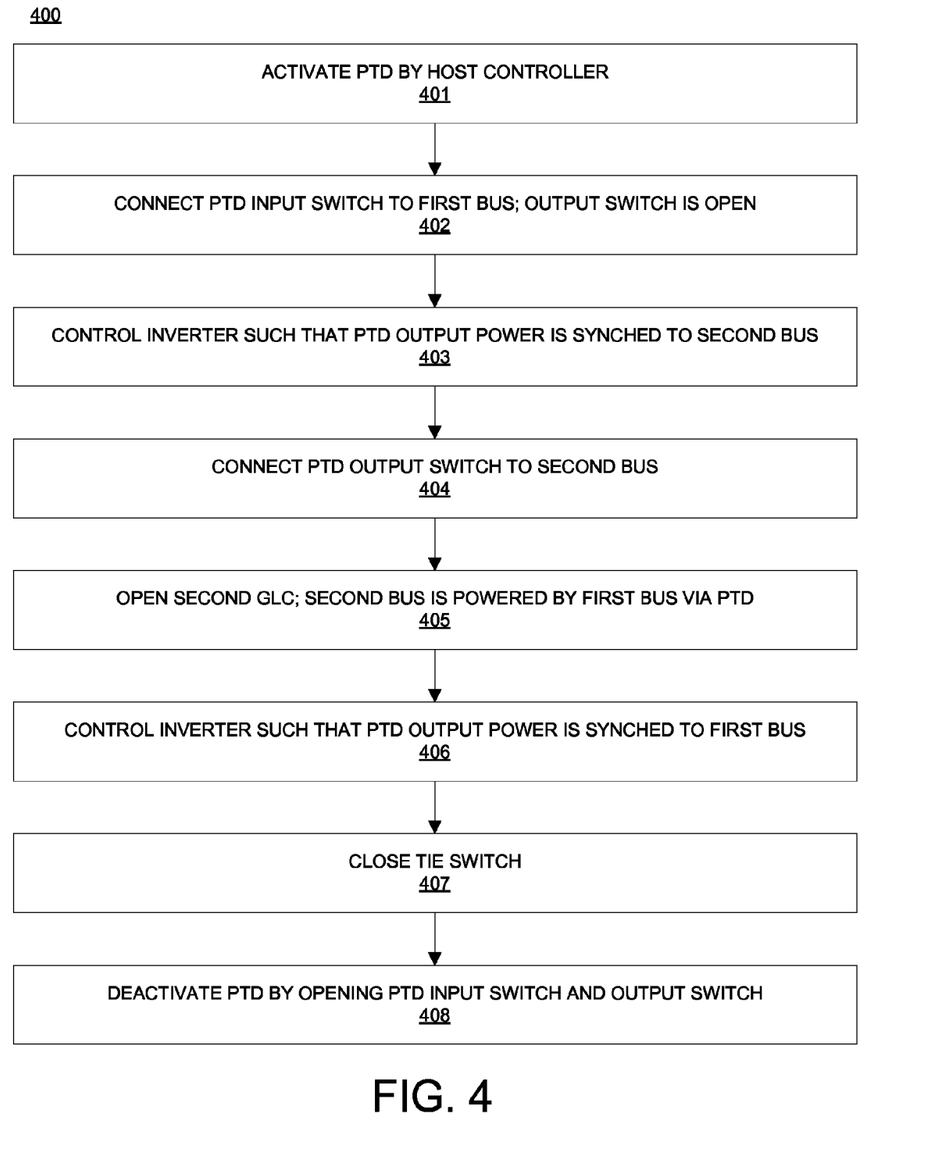
FIG. 4 illustrates an embodiment of a method for no break power transfer for a power generating system.

FIG. 4 illustrates an embodiment of a method 400 for no break power transfer for a power generating system. FIG. 4 is discussed with respect to FIGS. 1 and 2, and in particular, with respect to transferring power from first generator 101A and first bus 104A to second bus 104B. In block 401, the PTD (107, 200) is activated by the host controller 201; the PTD (107, 200) may be activated in response to, for example, a fault in generator 101B. In block 402, the input switch 204 is connected to bus 104A. Output switch 208 is open. In block 403, the voltage and frequency of the power output by the inverter 206 are synchronized to match that of generator 101A and bus 104A by voltage matching/synchronization control module 203. In block 404, output switch 208 is connected to the second bus 104B. Then, in block 405, GLC 103B is opened, causing bus 104B to be powered exclusively by generator 101A and bus 104A via the PTD (107, 200). The command to open GLC 103B may be issued by voltage matching/synchronization control module 203 to host controller 201 and GCU 102A. In block 406, the voltage and frequency of the power output by inverter 206 are synchronized to match that of the first bus 104A by voltage matching/synchronization control module 203. Because bus 104B is being powered by the PTD (107, 200) due to the opening on GLC 103B in block 405, this causes the voltage and frequency of the power on bus 104B to match the voltage and frequency of the power on bus 104A. The change in frequency and voltage output by the PTD (107, 200) during the synchronization of block 406 may be performed gradually, so as not to damage load 108B connected to bus 104B. At this point, the power on buses 104A and 104B match in voltage and frequency, allowing closing of the tie switch 105 in block 407 without causing damage to either of generators 101A-B or loads 108A-B due to voltage or frequency mismatch between the buses. Lastly, the input switch 204 and output switch 208 are opened, and the PTD (107, 200) is deactivated in block 408. Power then flows from generator 101A and bus 104A to bus 104B via tie switch 105. While the above discussion illustrates transfer of power from generator 101A and bus 104A to bus 104B, method 400 may similarly be used to transfer power from generator 101B and bus 104B to bus 104A. Control elements of the embodiments as described in FIGS. 1-4 may be implemented using analog circuitry, digital circuitry, and/or combinations thereof in various embodiments.

Figure 5:
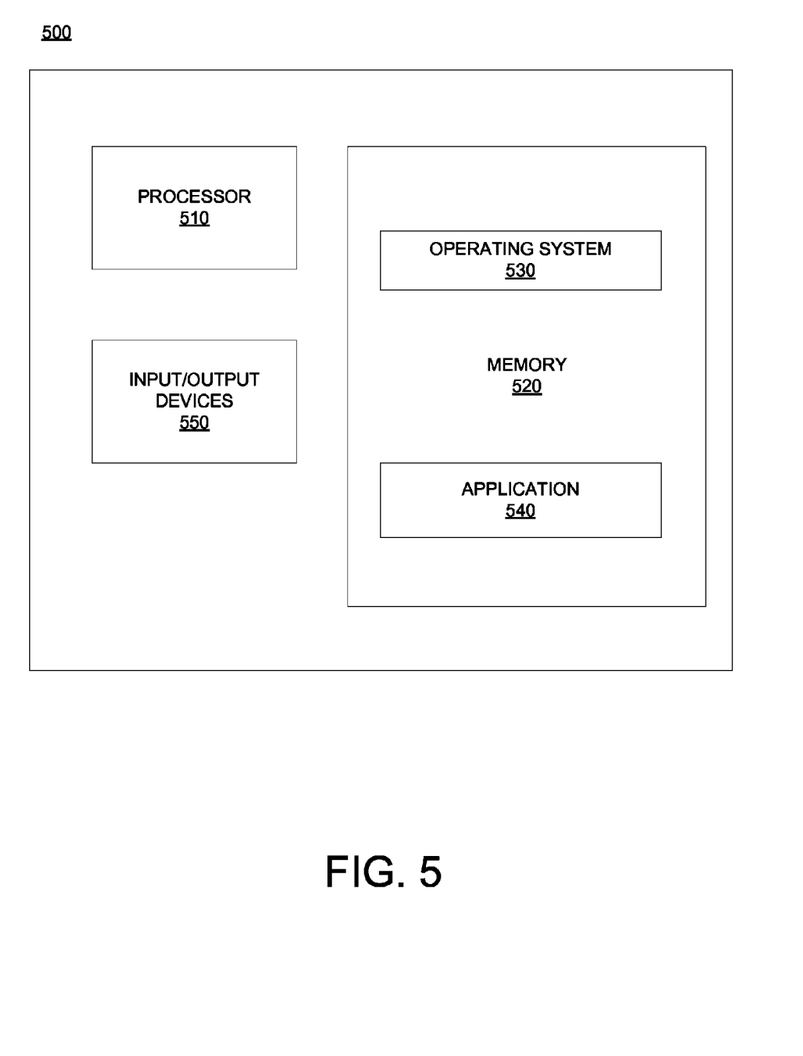
FIG. 5 illustrates an embodiment of a computing system that may be used in conjunction with embodiments of a method for no break power transfer for a power generating system.

FIG. 5 illustrates an example of a computer 500 which may be utilized by exemplary embodiments of a method for no break power transfer as embodied in software. Various operations discussed above may utilize the capabilities of the computer 500. One or more of the capabilities of the computer 500 may be incorporated in any element, module, application, and/or component discussed herein, such as the voltage matching/synchronization control module 203, host controller 201, GCUs 102A-B, and/or BPCU 106.

The computer 500 includes, but is not limited to, PCs, workstations, laptops, PDAs, palm devices, servers, storages, and the like. Generally, in terms of hardware architecture, the computer 500 may include one or more processors 510, memory 520, and one or more input and/or output (I/O) devices 550 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 510 is a hardware device for executing software that can be stored in the memory 520. The processor 510 can be virtually any custom made or commercially available processor, a central processing unit (CPU), a digital signal processor (DSP), or an auxiliary processor among several processors associated with the computer 500, and the processor 510 may be a semiconductor based microprocessor (in the form of a microchip) or a macroprocessor.

The memory 520 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 520 may incorporate electronic, magnetic, optical, and/or other types of storage media. Note that the memory 520 can have a distributed architecture, where various components are situated remote from one another, but can be accessed by the processor 510.

The software in the memory 520 may include one or more separate programs, each of which comprises an ordered listing of executable instructions for implementing logical functions. The software in the memory 520 may include a suitable operating system (O/S) 530, and one or more applications 540 in accordance with exemplary embodiments. As illustrated, the application 540 comprises numerous functional components for implementing the features and operations of the exemplary embodiments. The application 540 of the computer 500 may represent various applications, computational units, logic, functional units, processes, operations, virtual entities, and/or modules in accordance with exemplary embodiments, but the application 540 is not meant to be a limitation.

The operating system 530 may control the execution of other computer programs, and provides scheduling, input-output control, file and data management, memory management, and communication control and related services. It is contemplated by the inventors that the application 540 for implementing exemplary embodiments may be applicable on all commercially available operating systems, as well as customized operating systems for the specific real-time control application described herein.

Application 540 may be a source program, executable program (object code), script, or any other entity comprising a set of instructions to be performed. When a source program, then the program is usually translated via a compiler, assembler, interpreter, or the like, which may or may not be included within the memory 520, so as to operate properly in connection with the O/S 530. Furthermore, the application 540 can be written as an object oriented programming language, which has classes of data and methods, or a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 550 may include input devices such as, for example but not limited to, a mouse, keyboard, scanner, microphone, camera, etc. Furthermore, the I/O devices 550 may also include output devices, for example but not limited to a printer, display, etc. Finally, the I/O devices 550 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 550 also include components for communicating over various networks, such as the Internet or intranet.

If the computer 500 is a PC, workstation, intelligent device or the like, the software in the memory 520 may further include a basic input output system (BIOS) (omitted for simplicity). The BIOS is a set of essential software routines that initialize and test hardware at startup, start the O/S 530, and support the transfer of data among the hardware devices. The BIOS is stored in some type of read-only-memory, such as ROM, PROM, EPROM, EEPROM or the like, so that the BIOS can be executed when the computer 500 is activated.

When the computer 500 is in operation, the processor 510 is configured to execute software stored within the memory 520, to communicate data to and from the memory 520, and to generally control operations of the computer 500 pursuant to the software. The application 540 and the O/S 530 are read, in whole or in part, by the processor 510, perhaps buffered within the processor 510, and then executed.

When the application 540 is implemented in software it should be noted that the application 540 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 540 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

More specific examples (a nonexhaustive list) of the computer-readable medium may include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 540 is implemented in hardware, the application 540 can be implemented with any one or a combination of the following technologies, which are well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The technical effects and benefits of exemplary embodiments include reduction or elimination of a break during a power transfer and inrush current after the power transfer in a variable frequency power generating system.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. Additionally, while various embodiment of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method for no break power transfer in a variable frequency power generating system, the power generating system comprising a first bus connected to a first generator and a second bus connected to a second generator, the method comprising:
    configuring a power transfer device to output power to the second bus that is synchronized to match a voltage and a frequency of the second bus;
    reconfiguring the power transfer device to output power to the second bus that is synchronized to match a voltage and a frequency of the first bus; and
    closing a tie switch located between the first bus and the second bus;
    wherein configuring the power transfer device to output power to the second bus that is synchronized to match the voltage and the frequency of the second bus comprises:
        contacting an input switch of the power transfer device to the first bus;
        configuring an inverter of the power transfer device to output power that is synchronized to match the voltage and frequency of power the second bus;
        contacting an output switch of the power transfer device to the second bus; and
        opening a generator line contactor located between the second generator and the second bus.

2. The method of claim 1, wherein reconfiguring the power transfer device to output power to the second bus that is synchronized to match a voltage and a frequency of the first bus comprises:
    reconfiguring an inverter of the power transfer device to output power that is synchronized to match the voltage and frequency of power the first bus.

3. The method of claim 1, further comprising opening an input switch and an output switch of the power transfer device after closing the tie switch.

4. A power transfer device for no break power transfer in a variable frequency generating system, comprising:
    a voltage matching/synchronization control module, the voltage matching/synchronization control module configured to received input from a first bus and a second bus of the variable frequency power generating system;
    an input switch, the input switch being controlled by the voltage matching/synchronization control module;
    a rectifier/filter module connected to the input switch;
    an inverter connected to the rectifier/filter module, the inverter being controlled by the voltage matching/synchronization control module;
    an output filter connected to the inverter; and
    an output switch, the output switch being controlled by the voltage matching/synchronization control module;
    wherein the voltage matching/synchronization control module is configured to:
        control the power transfer device to output power to the second bus that is synchronized to match a voltage and a frequency of the second bus;
        reconfigure the power transfer device to output power to the second bus that is synchronized to match a voltage and a frequency of the first bus; and
        close a tie switch located between the first bus and the second bus.

5. The power transfer device of claim 4, wherein the voltage matching/synchronization control module is configured to control the inverter to synchronize power from the rectifier/filter module to match a predetermined voltage and frequency.

6. The power transfer device of claim 4, wherein controlling the power transfer device to output power to the second bus that is synchronized to match the voltage and the frequency of the second bus comprises:
    contacting the input switch to the first bus;
    configuring the inverter to output power that is synchronized to match the voltage and frequency of power the second bus;
    contacting the output switch to the second bus; and
    opening a generator line contactor located between the second generator and the second bus.

7. The power transfer device of claim 4, wherein reconfiguring the power transfer device to output power to the second bus that is synchronized to match a voltage and a frequency of the first bus comprises:
    reconfiguring the inverter to output power that is synchronized to match the voltage and frequency of power the first bus.

8. The power transfer device of claim 4, wherein the voltage matching/synchronization control module is further configured to open the input switch and the output switch after closing the tie switch.

9. A variable frequency power generating system, comprising:
    a first generator;
    a first generator line contactor controlled by a first generator control unit;
    a first bus powered by the first generator via the first generator line contactor;
    a second generator;
    a second generator line contactor controlled by a second generator control unit;
    a second bus powered by the second generator via the second generator line contactor;
    a tie switch located between the first bus and the second bus; and
    a power transfer device, the power transfer device connected between the first bus and the second bus, wherein the power transfer device is configured to output power that is synchronized to match a voltage and a frequency of either of the first bus or the second bus;
    wherein the power transfer device comprises:
        a voltage matching/synchronization control module, the voltage matching/synchronization control module configured to received input from a first bus and a second bus of the variable frequency power generating system;

an input switch, the input switch being controlled by the voltage matching/synchronization control module;

a rectifier/filter module connected to the input switch;

an inverter connected to the rectifier/filter module, the inverter being controlled by the voltage matching/synchronization control module;

an output filter connected to the inverter; and an output switch, the output switch being controlled by the voltage matching/synchronization control module.

10. The variable frequency power generating system of claim 9, wherein the power transfer device is further configured to control the tie switch, and to control the first and second generator line contactors via the first and second generator control units.

11. The variable frequency power generating system of claim 9, wherein the voltage matching/synchronization control module is further configured to control the inverter to convert power from the rectifier/filter module to match a predetermined voltage and frequency.

12. The variable frequency power generating system of claim 9, wherein, in the event a power transfer is needed between the first bus and the second bus, the power transfer device is configured to:

control the power transfer device to output power to the second bus that is synchronized to match a voltage and a frequency of the second bus;

reconfigure the power transfer device to output power to the second bus that is synchronized to match a voltage and a frequency of the first bus; and close the tie switch.

13. The variable frequency power generating system of claim 11, wherein controlling the power transfer device to output power to the second bus that is synchronized to match the voltage and the frequency of the second bus comprises:

contacting the input switch to the first bus;

configuring the inverter to output power that is synchronized to match the voltage and frequency of power the second bus;

contacting the output switch to the second bus; and opening a generator line contactor located between the second generator and the second bus.

14. The variable frequency power generating system of claim 11, wherein reconfiguring the power transfer device to output power to the second bus that is synchronized to match a voltage and a frequency of the first bus comprises:

reconfiguring the inverter to output power that is synchronized to match the voltage and frequency of power the first bus.

15. The variable frequency power generating system of claim 11, wherein the voltage matching/synchronization control module is further configured to open the output switch and the input switch after closing the tie switch.

16. A method for no break power transfer in a variable frequency power generating system, the power generating system comprising a first bus connected to a first generator and a second bus connected to a second generator, the method comprising:

configuring a power transfer device to output power to the second bus that is synchronized to match a voltage and a frequency of the second bus;

reconfiguring the power transfer device to output power to the second bus that is synchronized to match a voltage and a frequency of the first bus; and closing a tie switch located between the first bus and the second bus;

wherein reconfiguring the power transfer device to output power to the second bus that is synchronized to match a voltage and a frequency of the first bus comprises reconfiguring an inverter of the power transfer device to output power that is synchronized to match the voltage and frequency of power the first bus.

* * * * *